United States Patent
Neubauer et al.

(10) Patent No.: US 9,851,015 B2
(45) Date of Patent: Dec. 26, 2017

(54) PILOT-OPERATED PRESSURE RELIEF VALVE WITH LATERAL PRESSURE CONNECTION

(71) Applicant: Robert Bosch GmbH, Stuttgart (DE)

(72) Inventors: Ralf Neubauer, Lohr (DE); Liebhart Zaiser, Karlstadt (DE); Thomas Hirsch, Seligenstadt (DE); Ludmilla Graf, Lohr (DE); Harald Hahn, Neuhuetten (DE); Konrad Schneider, Fellen (DE); Dominik Wolf, Partenstein (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 14/869,084

(22) Filed: Sep. 29, 2015

(65) Prior Publication Data

US 2016/0091102 A1 Mar. 31, 2016

(30) Foreign Application Priority Data

Sep. 30, 2014 (DE) .................. 10 2014 219 740

(51) Int. Cl.
*F16K 17/10* (2006.01)
(52) U.S. Cl.
CPC .................. *F16K 17/105* (2013.01)
(58) Field of Classification Search
CPC .. F16K 17/105; F16K 17/10; Y10T 137/7766; Y10T 137/7769; Y10T 137/777
USPC ............... 137/490, 491, 492, 492.5
See application file for complete search history.

(56) References Cited

U.S. PATENT DOCUMENTS

| | | | | | |
|---|---|---|---|---|---|
| 2,870,781 | A | * | 1/1959 | Tennis | F16K 17/105 137/489.5 |
| 3,412,753 | A | * | 11/1968 | Baker | F16K 17/105 137/490 |
| 3,545,484 | A | * | 12/1970 | Allen | F16K 17/105 137/490 |
| 3,972,345 | A | * | 8/1976 | Court | F04B 49/24 137/490 |

OTHER PUBLICATIONS

Bosch Rexroth AG, Product Sheet RE 64602, Edition Feb. 2013, Pressure relief and feed valve, pilot operated, 16 pages (2013).
Bosch Rexroth AG, Product Sheet RD 18318-22, Edition Sep. 2009, Druckbegrenzungsventil, direktbetatigt, Sitzbauweise, Differenzflache, 3 pages (2009).

* cited by examiner

*Primary Examiner* — Mary McManmon
*Assistant Examiner* — Nicole Gardner
(74) *Attorney, Agent, or Firm* — Maginot, Moore & Beck LLP

(57) ABSTRACT

A valve includes a housing, in which a first valve body is accommodated so that it is moveable in a direction of a longitudinal axis, a first valve seat configured to be closed by the first valve body and arranged on the housing, a first fluid flow path extending from a first connection via the first valve seat to a second connection, a second valve seat closeable by a moveable second valve body, the second valve body formed separately from the first valve body, a second fluid flow path extending from the first connection via a bypass duct in the first valve body, onwards via the second valve seat to the second connection, so that pressure at the first connection is limited upwardly by the first and the second valve body in that hydraulic fluid is led to the second connection via the first fluid flow path.

14 Claims, 3 Drawing Sheets

PILOT-OPERATED PRESSURE RELIEF VALVE WITH LATERAL PRESSURE CONNECTION

This application claims priority under 35 U.S.C. §119 to patent application no. DE 10 2014 219 740.6, filed on Sep. 30, 2014 in Germany, the disclosure of which is incorporated herein by reference in its entirety.

The disclosure relates to a valve as described herein.

BACKGROUND

The data sheet RE 64602, discloses a valve. The valve is a pilot-operated pressure relief valve with feed function, which is designed as a built-in valve. The valve has a housing, which is also referred to as a bushing. A first valve body, which is also referred to as a piston, is accommodated in the housing so that it is moveable relative to a longitudinal axis. A first valve seat, which can be closed by the first valve body, is arranged on the housing. A first fluid flow path extends from a first connection via the first valve seat to a second connection. A pilot control is furthermore provided, which comprises a second valve seat, which can be closed by a moveable second valve body. The second valve body is formed separately from the first valve body. A second fluid flow path extends from the first connection via a bypass duct in the first valve body, onwards via the second valve seat to the second connection. The pressure at the first connection is limited upwardly by the first and the second valve body in that hydraulic fluid is led to the second connection via the first fluid flow path. The valve is therefore a pressure relief valve, which limits the pressure at the first connection.

The first connection is arranged end face-on to the first valve body, relative to the longitudinal axis, the second connection being arranged circumferentially to the first valve body, relative to the longitudinal axis.

The data sheet RD 18318-22, moreover discloses a pressure relief valve in which the first connection is arranged circumferentially to the first valve body, relative to the longitudinal axis, the second connection being arranged end-face on to the first valve body, relative to the longitudinal axis. This valve has no pilot control.

SUMMARY

The object of the disclosure is to transfer the connection assignment of the latter valve to the first aforementioned valve.

This object is achieved in that the first connection is arranged circumferentially to the first valve body, relative to the longitudinal axis, the second connection being arranged end face-on to the first valve body, relative to the longitudinal axis, a first orifice of the bypass duct being arranged circumferentially to the first valve body, relative to the longitudinal axis. The proposed arrangement of the first orifice allows hydraulic fluid, which flows from the circumferentially arranged first connection according to the disclosure, to pass into the bypass duct. The pilot control thereby functions even with the modified connection assignment.

The first and the second fluid flow path are each open in at least one operating state of the valve, but may possibly be closed in other operating states. The valve is preferably designed as a built-in valve, the housing being the bushing of the built-in valve. It is also feasible, however, for the housing to form an integral part of a larger assembly, for example an axial-piston machine. The second fluid flow path preferably bypasses the first valve seat via the bypass duct.

The bypass duct preferably forms a restrictor or an orifice plate in the second fluid flow path. The first orifice of the bypass duct is preferably connected to the first connection in any position of the first valve body. A second orifice, which is arranged at the other end of the bypass duct relative to the first orifice, preferably faces in the direction of the longitudinal axis, being arranged on the side of the first valve body remote from the first valve seat.

The second valve body is preferably moveable in the direction of the longitudinal axis, the closing directions of the first and the second valve body being opposed to one another. This results in an especially compact valve.

The second valve seat is preferably arranged on the first valve body. This results in an especially compact valve.

The second valve body preferably passes through the first valve body at the second valve seat, the second valve body, at least when it bears on the second valve seat, protruding beyond the first valve body. The protruding portion may serve to keep the second valve body in an opened position when the first valve body is in the opened position. For this purpose a stop, which can come into contact with the protruding portion, is preferably provided on the housing.

The pressure at the first connection preferably loads the first valve body in its closing direction, at least when the second valve seat is closed, and loads the second valve body in its opening direction. As a result, the movement of the first valve body can be controlled by the second valve body. The pressure at the first connection at the same time immediately lifts the second valve body off from the second valve seat. The flow resistance of the bypass duct is preferably at least 5 times greater than the flow resistance of the opened second valve seat.

The pressure at the second connection preferably loads the first valve body in its opening direction. This affords a feed function in which hydraulic fluid flows from the second working connection to the first working connection, when the pressure at the second working connection is higher than the pressure at the first working connection. This operating state may occur, for example, when the valve according to the disclosure is connected via the first working connection to a hydraulic cylinder, on which a tractive load is acting. The feed function serves to prevent a vacuum being produced in the cylinder by the tractive load.

A biased first spring preferably loads the first valve body in its closing direction. This ensures that the first valve seat is closed when the valve is in the unpressurized state.

A biased second spring preferably loads the second valve body in its closing direction, the bias of the second spring preferably being adjustable. The bias of the second spring determines the pressure at the first working connection at which the valve responds, so that the first fluid flow path is opened for pressure relief purposes.

The second spring is preferably held between the first and the second valve body. This results in an especially compact valve.

A spring plate, on which the second spring bears, is preferably arranged at the end of the second valve body remote from the second valve seat. This results in an especially compact valve, allowing the first valve body, in particular, to be of small design.

The features described above and those yet to be explained below may obviously be used not only in the particular combination specified but also in other combinations or in isolation without departing from the scope of the present disclosure.

BRIEF DESCRIPTION OF THE DRAWINGS

The disclosure is explained in more detail below with reference to the drawings attached, of which.

DETAILED DESCRIPTION

Figure 1:
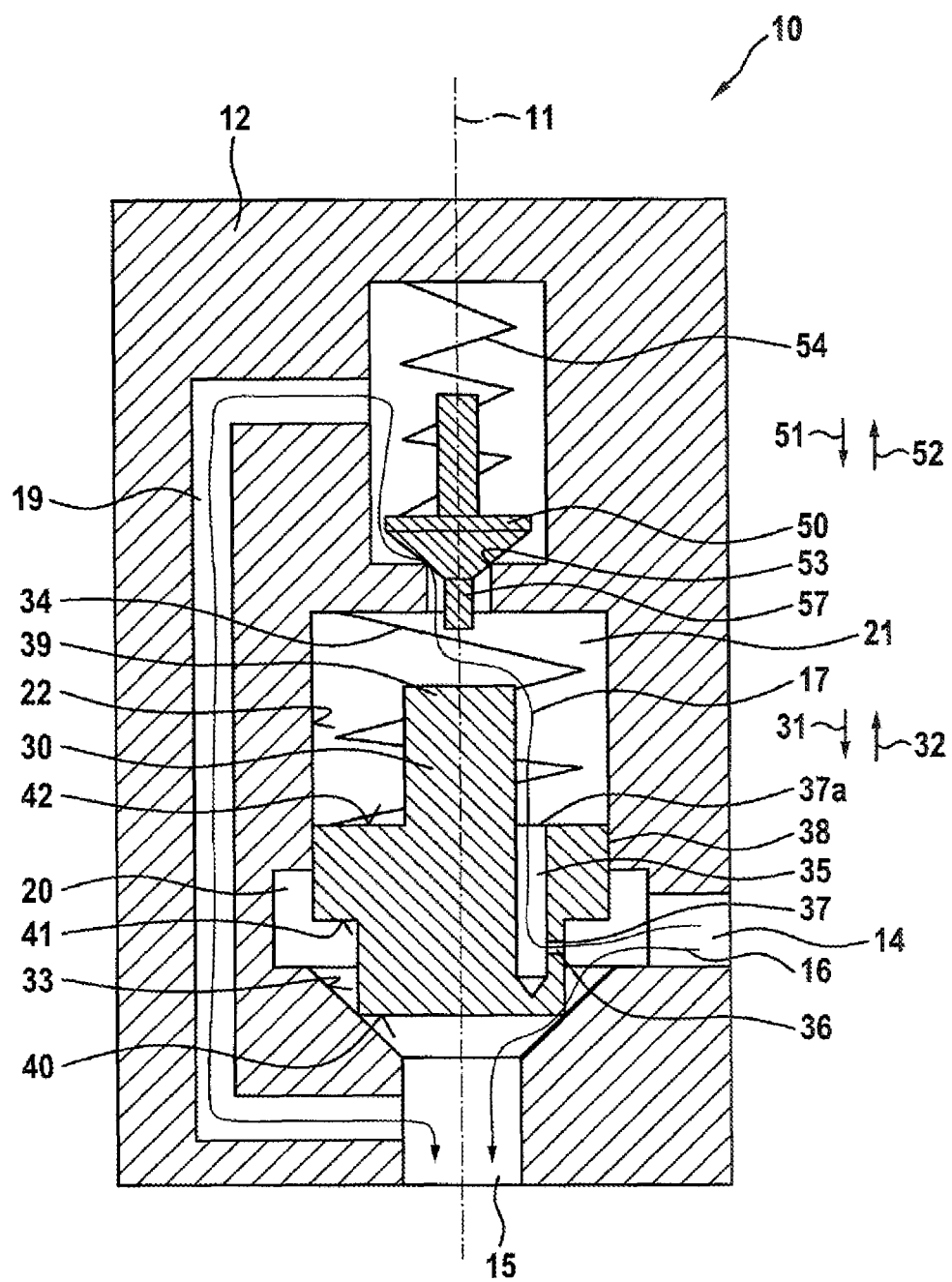
FIG. 1 shows a rough, diagrammatic sectional representation of a valve according to a first embodiment of the disclosure.

FIG. 1 shows a rough, diagrammatic sectional representation of a valve 10 according to a first embodiment of the disclosure. The valve 10 has a housing 12, in which a first valve body 30 is accommodated so that it can move in the direction of a longitudinal axis 11. Here it is guided with very little clearance in a piston bore 22, which is circular cylindrical relative to the longitudinal axis 11. A first valve seat 33, which is of a circular conical shape relative to the longitudinal axis 11, is assigned to the first valve body 30. The first valve body 30 is formed in the manner of a stepped piston, allowing it to close the first valve seat 33 tightly with its smaller end face 40.

The second connection 15 is arranged end face-on to the first valve body 30, relative to the longitudinal axis. The second connection 15 is formed by a bore, which is circular cylindrical relative to the longitudinal axis 11 and which opens into the first valve seat 33. The pressure at the second connection 15 accordingly acts on the smaller end face 40 of the first valve body 30.

The first connection 14 is formed by a circular cylindrical bore, the central axis of which intersects the longitudinal axis 11 at right angles. The first connection 14 is arranged circumferentially to the first valve body 30, relative to the longitudinal axis 11. The first connection 14 opens into a groove 20 in the housing 12, which runs annularly around the first valve body 30 and is arranged in the area of the annular surface 41 of the first valve body. The groove 20 ensures that hydraulic fluid is distributed evenly over the entire exposed cross section on the first valve seat 33. The pressure at the first connection 14 acts directly on the annular surface 41 of the first valve body 30.

The first connection 14 is connected by way of a bypass duct 35 in the first valve body 30 to a control chamber 21, which is defined by the housing 12 and the first valve body 30. Here the hydraulic fluid can pass from the first connection 14 into the control chamber 21 solely via the bypass duct 35. The bypass duct 35 has a first orifice, which according to the disclosure is arranged circumferentially on the first valve body 30, relative to the longitudinal axis 11, so that it is situated directly opposite the first connection 14 in any position of the first valve body 30. At the opposite end the bypass duct 35 has a second orifice 37a, which opens into the control chamber 21. The second orifice 37a faces in the direction of the longitudinal axis 11, being arranged on the side of the first valve body 30 remote from the first valve seat 33. A restrictor 36, at which a fall in pressure occurs when the hydraulic fluid flows along the second fluid flow path 17, is arranged in the bypass duct between the first and the second orifice 37; 37a. Whenever the second fluid flow path 17 is closed, the pressure in the control chamber 21 is equal to the pressure at the first connection 14. This pressure therefore acts both on the annular surface 41 and on the larger end face 42 of the first valve body 30, so that the latter is effectively pressed against the first valve seat 33. It does not matter here that the larger end face 42 is not flat, owing to the presence of the stop 39.

A second valve seat 53, which takes the form of an edge running annularly around the longitudinal axis 11, is also formed in the housing. A second valve body 50, which has a circular conical sealing face, relative to the longitudinal axis 11, serving to seal the second valve seat 53, is assigned to the second valve seat 53. The closing direction 31 of the first valve body 30 and the closing direction 51 of the second valve body 50 are identically oriented, that is to say downwards in FIG. 1. The second fluid flow path 17 runs from the first connection 14 via the bypass duct 35, onwards via the control chamber 21, via the second valve seat 50, via the connecting duct 19 in the housing 12 to the second connection 15. The first fluid flow path 16 runs from the first connection 14 via the first valve seat 33 to the second connection 15.

The first valve body 30 is pressed against the first valve seat 33 by the biased first spring 34. The second valve body 50 is pressed against the second valve seat 53 by the biased second spring 54. The first and the second spring 34; 54 are preferably helical springs. When the valve 10 is in the unpressurized state, both fluid flow paths 16; 17 are accordingly closed. If the pressure at the first connection 14 now rises, the first valve body 30 is pressed against the first valve seat 33, as explained above. The second valve body 50 is loaded in opposition to the biasing force of the second spring 54. As soon as the pressure at the first connection 14 is great enough, the second valve body 50 lifts off from the second valve seat 53. A fluid flow consequently flows along the second fluid flow path 17 from the first working connection 14 to the second working connection 15. This causes a fall in pressure at the restrictor 36 in the bypass duct 35. A smaller pressure thereby acts on the larger end face 42 of the first valve body 30 than on its annular surface 41. The corresponding pressure and surface ratios are designed so that, in effect, a force results which lifts the first valve body 30 off from the first valve seat 33, so that the first fluid flow path 16 is opened.

Eventually the stop 39 on the first valve body 30 impinges on the sidewall of the control chamber 21, at the same time impinging on a protruding portion 57 of the second valve body 50, so that the latter is kept in the opened position.

If the pressure at the first connection 14 now falls, the corresponding pressure on the first valve body 30 eventually no longer suffices to overcome the biasing force of the first and the second spring 34; 54. As a result, the first and the second valve body 30; 50 move towards their valves seats 33; 53, the second valve seat 53 closing first, so that the second fluid flow path 17 is interrupted. As a result, the fall in pressure at the restrictor 36 ceases, so that the pressure at the first working connection 14 acts both on the annular surface 41 and on the larger end face 42 on the first valve body 30. The first valve body 30 is thereby pressed against the first valve seat 33, so that the first fluid flow path 16 is closed. The valve 10 is then back in the initial position described above.

Figure 2:
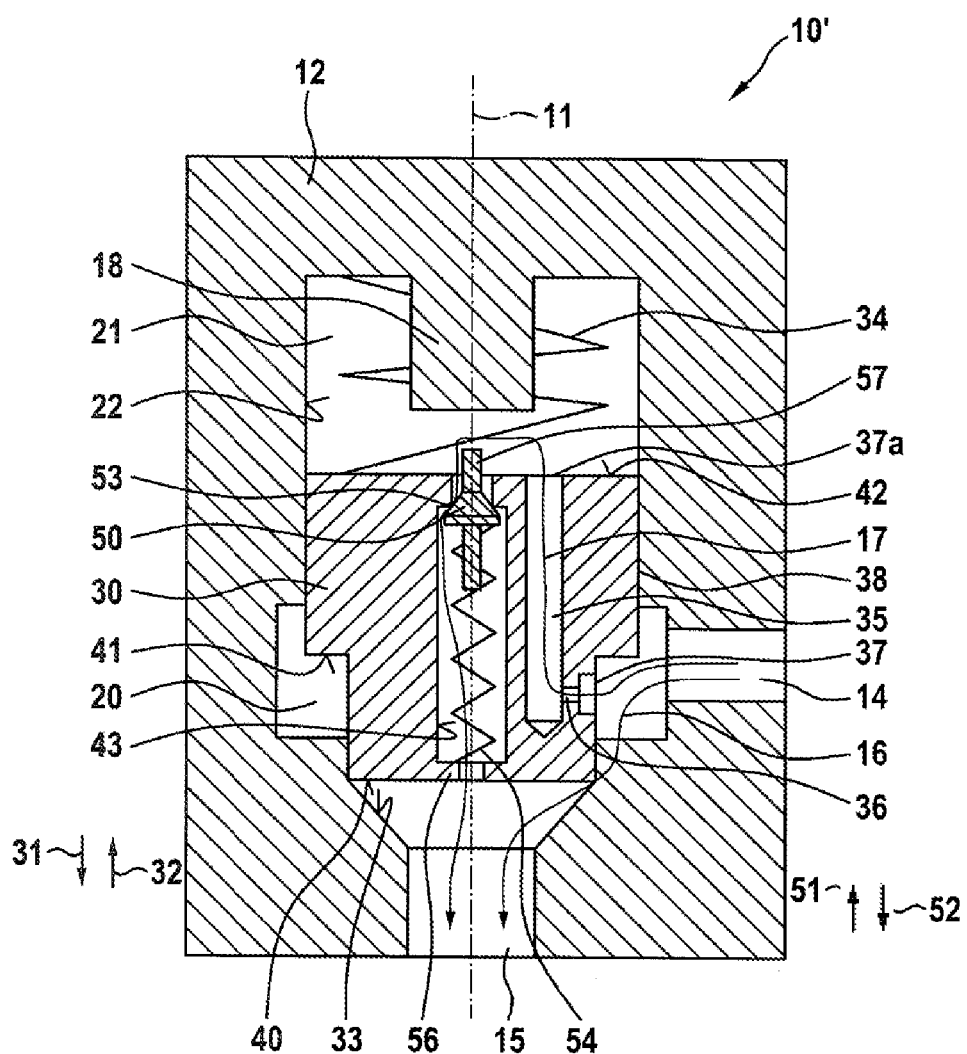
FIG. 2 shows a rough, diagrammatic sectional representation of a valve according to a second embodiment of the disclosure.

FIG. 2 shows a rough, diagrammatic sectional representation of a valve 10' according to a second embodiment of the disclosure. The second embodiment is of identical design to the first embodiment, except for the differences described below, so that reference is made to the embodiment in FIG. 1 regarding this. Here the same or corresponding parts in FIGS. 1 and 2 are identified by the same reference numerals.

The second valve seat 53 is arranged in the first valve body 30. The second valve body 50 is moveably accommodated in a bore 43 of the first valve body 30. The bore 43 at the same time replaces the connecting duct (no. 19 in FIG. 1) by establishing a fluid exchange connection between the second valve seat 53 and the second connection 15. The second fluid flow path 17 runs from the first connection 14, via the bypass duct 35, onwards via the control chamber 21, via the second valve seat 53, via the bore 43 to the second connection 15.

An annular, circumferential step 56, which if desired may be formed by a separate retaining ring, is provided on the inner circumferential face of the bore 43. The second spring 54 is fitted under pre-tension between the step 56 and the second valve body 50, so that the second valve body 50 is pressed in the direction of the second valve seat 53. The closing direction 31 of the first valve body 30 is opposed to the closing direction 51 of the second valve body 50, both closing directions 31; 51 running parallel to the longitudinal axis 11.

The second valve body 50 passes through the first valve body 30 at the second valve seat 53. The second valve body 50, at least when it bears on the second valve seat 53, protrudes beyond the first valve body 30. The corresponding protruding portion 57 comes into contact with a stop 18 on the housing 12, so that the second valve body 50, as in the first embodiment, is kept in the opened position when the first valve body 30 is in the opened position.

The modified arrangement of the second valve seat 53 and the second valve body 50 reduces the space required compared to the first embodiment. This does not result in any modifications compared to the first embodiment in terms of the operating principle of the valve 10'.

Figure 3:
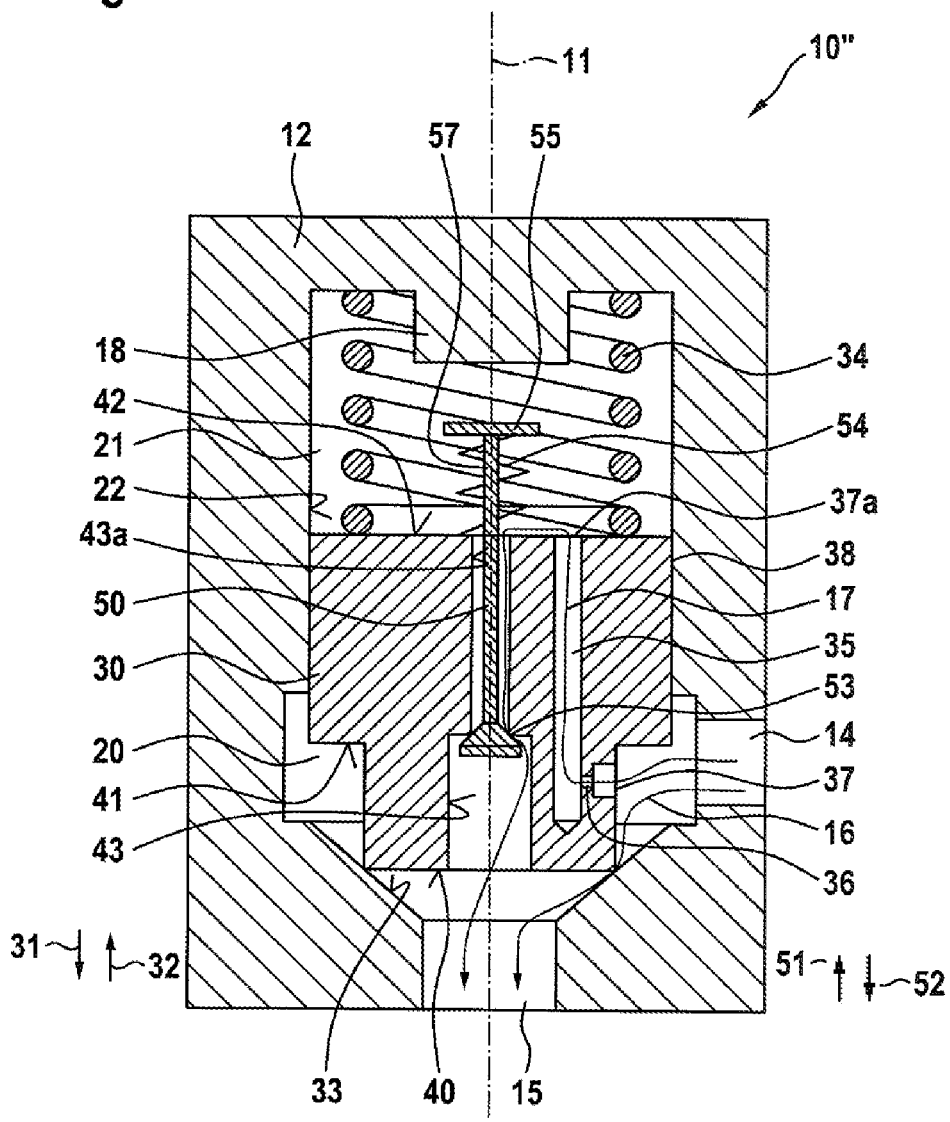
FIG. 3 shows a rough, diagrammatic sectional representation of a valve according to a third embodiment of the disclosure.

FIG. 3 shows a rough, diagrammatic sectional representation of a valve 10" according to a third embodiment of the disclosure. The third embodiment is of identical design to the second embodiment, except for the differences described below, so that reference is made to the embodiment in FIGS. 1 and 2 regarding this. Here the same or corresponding parts in FIGS. 1, 2 and 3 are identified by the same reference numerals.

The second spring 54 encloses the protruding portion 57 of the second valve body 50. A spring plate 55 is arranged at the outer end of the protruding portion 57. The second spring 54 is fitted between the spring plate 55 and the first valve body 30 under pre-tension. A portion of the second spring 54 may conceivably be accommodated in a countersink (not shown) in the first valve body 30, in order that the maximum travel of the second valve body 50 may be selected irrespective of the overall space required for the second spring 54.

In the third embodiment, too, the protruding portion 57 of the second valve body 50 impinges on the step 18 on the housing 12, in order to keep the second valve body 50 in an opened position when the first valve body 30 is in the opened position.

The chosen distance between the second valve seat 53 and the upper end of the first valve body 30 in FIG. 3 is greater than in the second embodiment. There the second valve body 50 is guided with a significant clearance in a portion 43a of the bore 43. This chosen clearance is large enough to allow a sufficient quantity of hydraulic fluid to flow along the second fluid flow path 17. The large length of the portion 43a ensures that the second valve body 50 is oriented substantially parallel to the longitudinal axis 11, so that the second valve seat 53 can be reliably closed.

LIST OF REFERENCE NUMERALS

10 valve (first embodiment)
10' valve (second embodiment)
10" valve (third embodiment)
11 longitudinal axis
12 housing
14 first connection
15 second connection
16 first fluid flow path
17 second fluid flow path
18 stop (for protruding portion)
19 connecting duct
20 annular groove
21 control chamber
22 piston bore
30 first valve body
31 closing direction of the first valve body
32 opening direction of the first valve body
33 first valve seat
34 first spring
35 bypass duct
36 restrictor
37 first orifice of the bypass duct
37a second orifice of the bypass duct
38 outer circumferential surface of the first valve body
39 stop (for the protruding portion)
40 smaller end face
41 annular surface
42 larger end face
43 bore
43a portion of the bore
50 second valve body
51 closing direction of the second valve body
52 opening direction of the second valve body
53 second valve seat
54 second spring
55 spring plate
56 step
57 protruding portion

What is claimed is:

1. A valve comprising:
    a housing;
    a first valve body accommodated in the housing and configured to be moveable along a longitudinal axis, the first valve body including a bypass duct having a first orifice located radially outwardly in the first valve body relative to the longitudinal axis;
    a first valve seat configured to be closed by the first valve body and arranged on the housing at a lower portion of the valve along the longitudinal axis;
    a first connection arranged circumferentially to the first valve body relative to the longitudinal axis;
    a second connection arranged end face-on to the first valve body and aligned with the longitudinal axis;
    a first fluid flow path extending from the first connection via the first valve seat to the second connection;
    a movable second valve body formed separately from the first valve body;
    a second valve seat closeable by the moveable second valve body; and
    a second fluid flow path extending from the first connection upwardly along the longitudinal axis via the bypass duct in the first valve body, via the second valve seat, and then to the second connection.

2. The valve according to claim 1, wherein:
    the second valve body is moveable along the longitudinal axis,
    a closing direction of the first valve body is opposed to a closing direction of the second valve body, and the closing direction of the second valve body is opposed to the closing direction of the first valve body.

3. The valve according to claim 1, wherein the second valve seat is arranged on the first valve body.

4. The valve according to claim 3, wherein:
the second valve body is configured to pass through the first valve body at the second valve seat, and
the second valve body is configured to protrude beyond the first valve body when the second valve body bears on the second valve seat.

5. The valve according to claim 1, wherein:
the pressure at the first connection loads the first valve body in a closing direction of the first valve body at least when the second valve seat is closed, and
the pressure at the first connection loads the second valve body in an opening direction of the second valve body.

6. The valve according to claim 5, wherein a pressure at the second connection loads the first valve body in an opening direction of the first valve body.

7. The valve according to claim 1, further comprising:
a biased first spring configured to load the first valve body in a closing direction of the first valve body.

8. The valve according to claim 7, further comprising:
a biased second spring configured to load the second valve body in a closing direction of the second valve body,
wherein a bias of the second spring is adjustable.

9. The valve according to claim 1, further comprising:
a biased second spring configured to load the second valve body in a closing direction of the second valve body,
wherein a bias of the second spring is adjustable,
wherein the second valve seat is arranged on the first valve body, and
wherein the second spring is held between the first and the second valve body.

10. The valve according to claim 9, further comprising:
a spring plate, on which the second spring bears, is arranged at an end of the second valve body remote from the second valve seat,
wherein the second valve body is configured to pass through the first valve body at the second valve seat, and
wherein the second valve body is configured to protrude beyond the first valve body when the second valve body bears on the second valve seat.

11. The valve according to claim 1, wherein:
in a closed configuration, a pressure at the first connection is limited upwardly along the longitudinal axis by the first valve body and the second valve body, and
in an open configuration, hydraulic fluid is led to the second connection via the first fluid flow path.

12. The valve according to claim 1, wherein:
the first valve body includes an annular face extending along a first axis perpendicular to the longitudinal axis at a location above the first valve seat, the annular face having a first area;
the first valve body includes at least one end face positioned above the annular face, the at least one end face having a second area;
the annular face is in fluid communication with the first connection;
the at least one end face is in fluid connection with the first connection through the bypass duct; and
the second areas is larger than the first area.

13. The valve according to claim 1, further comprising:
a control chamber defined at least in part by the housing and the first valve body, wherein hydraulic fluid passes from the first connection into the control chamber solely via the bypass duct.

14. The valve according to claim 13, wherein the bypass duct is in constant fluid communication with the first connection and the control chamber.

* * * * *